Sept. 20, 1938.        L. J. LUNAS                    2,130,852
              ELECTRICAL MEASURING INSTRUMENT
                   Filed Sept. 19, 1936
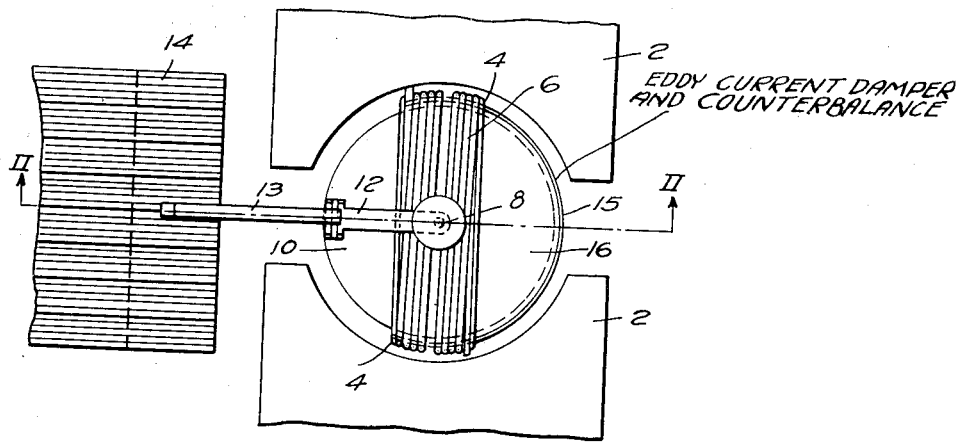
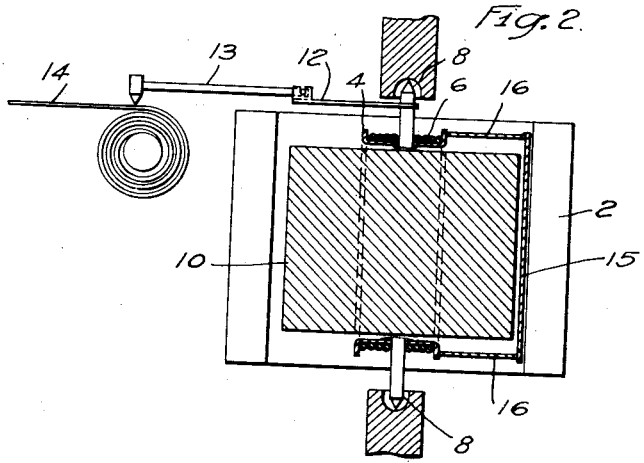
WITNESSES:
INVENTOR
Lawrence J. Lunas.
BY
ATTORNEY Patented Sept. 20, 1938

2,130,852

UNITED STATES PATENT OFFICE 2,130,852

ELECTRICAL MEASURING INSTRUMENT

Lawrence J. Lunas, Verona, N. J., assignor to Westinghouse Electric & Manufacturing Company, East Pittsburgh, Pa., a corporation of Pennsylvania Application September 19, 1936, Serial No. 101,681

5 Claims. (Cl. 171—95)

The invention relates to electrical measuring instruments, and particularly to the provision of an efficient and effective damping means for an instrument of the d'Arsonval type.

In this type of instrument, in which a moving coil rotates between the pole pieces of a permanent magnet against the restraint of a spring, it is necessary to provide a damping device for the coil to prevent overswing of the pointer or recording pen driven by the coil upon the occurrence of sudden application of energy to the coil. Such overswing, in the case of an indicating instrument, would not be particularly serious because the indicating pointer would ultimately assume its proper position, giving a true indication of the current traversing, or voltage impressed on, the winding. However, in the case of a recording instrument, any overswing beyond the true value will result in an erroneous record, which, of course, is undesirable.

In the past, it has been common to use a vane movable with the coil through the field of a separate permanent magnet, whereby the eddy currents induced in the vane damp the movement of the coil. This, however, adds considerable weight and cost to the instrument and adds to the inertia of the coil. Also, alignment troubles, causing friction and binding of the coil bearings, are apt to occur. Of course, eddy currents are produced in the conventional bobbin, but they are inadequate to give sufficient damping.

It is an object of the present invention to provide an improved damping device for an instrument of the moving-coil type which is effective in its operation, adds a minimum weight and cost to the instrument consistent with its effectiveness, and which is disposed to balance the moving coil to minimize wear and binding of the coil bearings.

Other objects of the invention will be apparent from the following description and the accompanying drawing, in which:

Figure 1 is a plan view with portions broken away, of an instrument embodying the present invention; and Fig. 2 is a view in vertical section taken on the line II—II of Fig. 1.

Referring more particularly to the drawing, the instrument to which the invention may be applied comprises permanent magnet pole pieces 2 having arcuate faces defining a substantially circular well in which the moving element rotates.

The moving element comprises a member 4 of chanel shape and a winding 6 is disposed to constitute a bobbin of conventional form. The bobbin is supported for rotation by pivots 8 disposed in suitable bearings, as shown schematically. As is well known, when the winding 6 is energized by an electric current to be measured, it and the bobbin carrying it will rotate in the air gap of the magnet 2. In order to measure the quantity of such current, the rotation of the bobbin is opposed by a pair of spiral springs, which are not shown here for purposes of clearness, until it assumes a position of rest indicative of such magnitude. Such spiral springs, as is usual, also constitute the terminals for the winding 6.

In order to reduce the reluctance of the air gap of the permanent magnet 2 and to provide a uniform radial field in which the coil moves, a cylindrical iron core 10 is disposed axially of the bobbin 4 and relatively close to the arcuate pole faces of the magnet 2. Such core 10 is supported from any desired adjacent structure of the instrument in a stationary manner so that the bobbin is free to rotate around it.

The spindle of the bobbin is provided with an arm 12 pivotally supporting one end of a recording pen 13, the other end of which rests upon a record chart 14. Movement of the bobbin, therefore, swings the pen across the chart, leaving a record of the extent of movement of the bobbin, and accordingly, a record of the degree of energization of the coil 6. As is usual, the chart is preferably driven by some form of time-controlled mechanism.

The construction thus far described is that of a well known type of d'Arsonval movement, and it is not believed that further description or illustration is required.

In the event of a sudden application of voltage or current to the winding 6, it should be obvious that the pointer or pen 12 will overshoot the position it should normally take against the bias of the restraining spiral springs, by reason of the inertia of the moving parts. In order to correct this, it is desirable to damp such movement of the parts, and this is accomplished by means of a semi-cylindrical cup 15 having top and bottom semi-circular walls 16. The cup and walls may be of copper, or other non-magnetic metal having a low resistance to eddy currents. As shown more clearly in Fig. 2, the straight edges of the top and bottom walls 16 may be soldered or otherwise secured to the edge of the bobbin 4, to be carried thereby, or, since such walls may be omitted in some cases, the straight edges of the member 15 may be soldered to the vertical edges of the bobbin.

It should be obvious from the foregoing that as the coil 6 rotates in the air gap, the semi-cylindrical damping member 15, having a center of curvature preferably the same as that of the magnet pole face, is carried thereby across the pole face. Eddy currents will, therefore, be produced in the member 15 to resist such movement, such resistance being proportional to the speed of movement of the coil, bringing the pen 13 gradually into its true position indicative of the magnitude of the current or energy impressed on the coil.

An important aspect of the invention resides in the disposition of the damping member 15 on the side of the bobbin opposite to that from which the pen arm 12 extends. By this means, the weight of the member 15 may be chosen to counter-balance such arm, and the pen 13 resting thereon to prevent side thrust or binding of the bobbin pivots, thereby increasing the sensitivity of the instrument and prolonging its life. Accordingly, the member 15 has the dual function of damping the movement of the bobbin and properly balancing it.

The present invention produces more effective damping than the use of a separate vane under the influence of a separate permanent magnet, and tests indicate the damping is more effective and efficient than with other methods heretofore employed. In addition, the dispostion of the damping cup opposite the pen arm results in a desired counter-balanced weight distribution contributing materially to the efficiency and life of the instrument.

Although the invention has been described as applied to a recorder, quite obviously the pen arm 13 may be replaced by a pointer cooperating with a scale, instead of chart 14, and various other modifications of the structure shown may be adapted without departing from the spirit of the invention as limited by the appended claims.

I claim as my invention:

1. In a measuring instrument of the d'Arsonval type having a bobbin for rotation between the arcuate pole faces of a permanent magnet and a magnetic core and indicating means including an arm projecting from one side of the bobbin, means for critically damping the movement of said bobbin comprising a semi-cylindrical member of non-magnetic and electrically conductive sheet metal, the center of curvature of which is substantially the same as that of said pole faces, and means for securing said member to said bobbin on the side opposite to said indicating means for movement across a pole face of said magnet, said member being positioned within the air gap formed by said core and pole faces.

2. In a measuring instrument of the d'Arsonval type having a bobbin for rotation between the arcuate pole faces of a permanent magnet and a magnetic core, means for critically damping the movement of said bobbin comprising a semi-cylindrical member of non-magnetic and electrically conductive sheet material, the center of curvature of which is substantially the same as that of said pole faces, said member being positioned within the air gap formed by said core and pole faces, and means for securing said member to said bobbin for movement therewith across a pole face of said magnet, said securing means including semi-circular members at each end of said semi-cylindrical member secured thereto at each end thereof and to the two ends, respectively, of said bobbin.

3. In an electrical measuring instrument of the type having a moving coil, a magnetic core and a permanent magnet and means for rotatably supporting the coil between the spaced confronting arcuate pole faces of the permanent magnet, means projecting from the axis of rotation of the coil for indicating the rotation of said coil, a device for damping the movement of said coil comprising arcuate electro-conductive and non-magnetic means carried by the coil and extending laterally therefrom within the air gap formed by the core and pole faces for movement across a pole piece of said magnet but out of contact therewith whereby eddy currents are produced in said means to retard the movement of the coil, said means being so disposed and of such weight that it, the coil and the indicating means constitute a counterbalanced system with respect to the axis of rotation of the coil.

4. In a measuring instrument having a magnetic structure for passing magnetic flux through an air gap, and a substantially balanced coil member rotatable about an axis with reference to said magnetic structure and positioned in the path of said magnetic flux; an indicating device carried by said coil member; and non-magnetic and electrically conductive damping means positioned within said air gap and carried by said coil member; said indicating device and said damping means having centers of gravity displaced in opposite directions from said axis.

5. In a measuring instrument having a magnetic structure for passing a magnetic flux through an air gap and a measuring unit rotatable about an axis with reference to said magnetic structure and unbalanced about said axis, said unit comprising a coil positioned in the path of a first portion of said magnetic flux; a non-magnetic and electrically conductive damping member carried by said unit and extending into the path of a second portion of said magnetic flux, said member being positioned to counterbalance at least a portion of the unbalance of said unit.

LAWRENCE J. LUNAS.